INVENTOR.
HORST ZARM
BY
Frank R. Jinfani
AGENT

INVENTOR
HORST ZARM

BY
[signature]
AGENT

INVENTOR.
HORST ZARM
BY Frank R. Jeifari
AGENT

July 21, 1964 H. ZARM 3,141,676

SEMI-AUTOMATIC REPRODUCTION DEVICE FOR SOUND CARRIERS IN DISC FORM

Filed Dec. 23, 1960 4 Sheets-Sheet 4

INVENTOR
HORST ZARM

BY Frank R. Jufani
AGENT

1

3,141,676

SEMI-AUTOMATIC REPRODUCTION DEVICE FOR SOUND CARRIERS IN DISC FORM

Horst Zarm, Berlin-Zehlendorf, Germany, assignor to North American Philips Company, Inc., New York, N.Y., a corporation of Delaware Filed Dec. 23, 1960, Ser. No. 77,968

Claims priority, application Germany Jan. 14, 1960

11 Claims. (Cl. 274—9)

This invention relates to a semi-automatic reproduction device for sound carriers in disc form of different diameters which are slid on the turntable from the side and, before reaching their position for reproduction, displace feelers scanning the diameter of the disc, which feelers cooperate with a slide shiftable into the direction of the insertion of the disc, the shifting of which slide controlling the permitted depth of insertion of the disc, the centering of the inserted disc, the switching-on of the driving motor and the other reproduction operations.

Such semi-automatic reproduction devices are known. In those devices, for the scanning of the diameter of the disc frequently a mechanism of the lazy-tongs type is used and the centre of the sound carriers in disc form is determined by scanning the disc at three points.

However, these reproduction devices have the following drawbacks: In the considerable difference in diameter which exists for example between a 17 cm. and a 30 cm.-record, the limbs of the lazy-tongs are spread so far apart that the coupling members connected to the limbs have unfavourable angular positions with respect to one another which requires a high precision in the manufacture. This high precision should be maintained also during the life-time of the reproduction apparatus. In addition, the snapping path in these scanning devices in the respective position is very small, so that no high reliability exists for the introduction of the separate reproduction operations.

The object of the invention is to mitigate these drawbacks. According to the invention, a semi-automatic reproduction device of the above type is constructed so that on the slide, shiftable against a spring, on the right and left hand sides of the centre of the disc at a mutual distance which is somewhat smaller than the smallest diameter of the disc, feeler studs for the scanning of the diameter are provided. In addition, feeler lever is provided which comprises a feeler stud, engaging the edge of the disc, and several catcher studs, said lever being swingable against a spring, the catcher studs of said lever, when inserting a disc, being swung before a trap and the catcher studs on the feeler lever being arranged in such a manner that the catcher stud corresponding to the diameter of the disc brings the trap into its position of locking a short time before the disc reaches its position for reproduction and that coupling members are connected to the trap which when closing the trap, control the further course of the switching operations.

Preferably, in such a reproduction device, the catcher stud corresponding to the largest diameter of the disc is immediately connected on the slide.

In addition it is of advantage to provide on the slide an additional feeler stud approximately in the centre between the two other feeler studs in a manner such that in the rest position of the slide the additional feeler stud is positioned near to the edge of the turntable and becomes also operative when inserting the smallest disc.

As a trap may advantageously be provided a strip shiftable approximately in the direction of insertion of the disc and having, at its free end, a rectangular recess which is completed to a U-shaped receiving member for the catcher studs by an angular member provided on a locking bar which can be turned 90°.

2

The said strip may be provided on an intermediate lever which is under the action of a snap spring which conducts the lever into the nearest final position determined by a stop member.

According to an advantageous embodiment of the invention, the intermediate lever comprises a further trap which, when swinging the intermediate lever, is conducted into its opened and closed positions respectively and cooperates with a catcher stud, the release of which starts the further reproducing operations, such as switching on the motor, opening the low-frequency switch, setting up the tone arm introducing the centring member into the central hole of the disc, etc.

The catcher stud may be provided on a control lever which is prestressed by means of a spring, which lever in known manner controls the reproduction operations via a curved disc when swinging.

It is of advantage to construct the reproduction device so that an adjusting device for the tone arm is coupled to the slide which device, when inserting a disc, swings the tone arm into the position corresponding to the initial groove of the disc, so that, when the tone arm or tone head is lowered, the scanning needle is set up at the correct position for reproducing the record in question.

In this case, the side of the slide facing the swing bearing of the tone arm may advantageously be constructed as a control curve or may be provided with such a curve along which may slide an intermediate member swinging the tone arm outwards only.

As intermediate member may be used an intermediate lever with a stop member said lever being pressed against the control curve under the action of a spring, and said stop member engaging a stud of the tone arm whereas by the control lever a lever which exerts a torque produced by a spring on the tone arm via a stop member, as a result of which the tone arm follows the shape of the control curve, when opening the second trap is swung so far that the tone arm can be freely moved inwards.

It is of advantage that the slide on its supporting member is guided short enough as to effect a self-retardation when inserting the disc at an angle to the direction of insertion.

In order that the invention may be readily carried into effect, one embodiment thereof will now be described, by way of example, with reference to the diagrammatic drawing in which FIGURE 1 is a centring and control device in the rest position.

Figure 1:
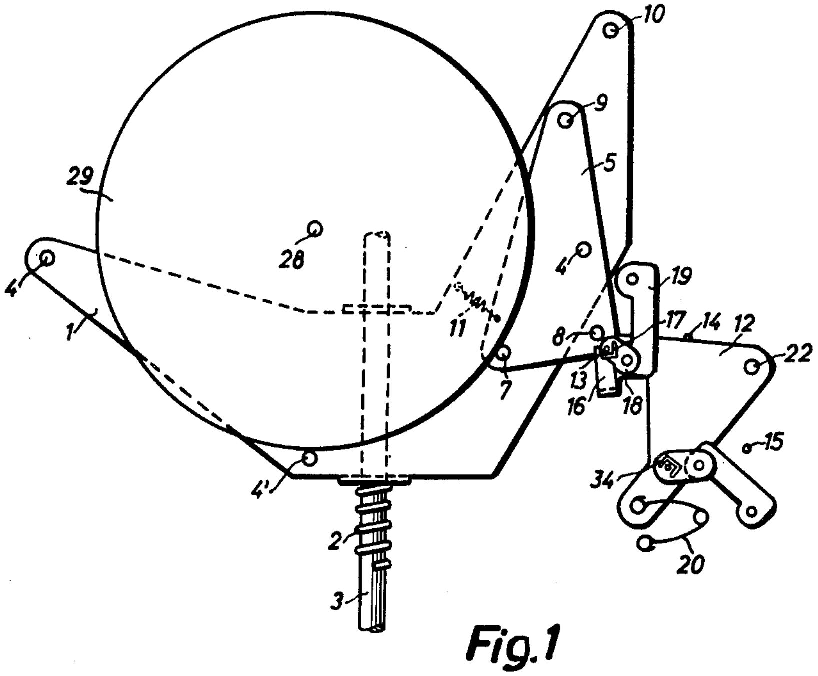

In the device shown in the drawing, a slide 1 shiftable against the action of a spring 2 is provided on a rail 3. The slide carries the feeler studs 4 on the left and right hand sides of the turntable 29 as well as a further feeler stud 4'. In addition, a catcher stud 10 is provided on the slide at its right hand top end. A feeler lever 5 is provided in a rotatable manner on one of the feeler studs 4 and carries the feeler stud 7 as well as the catcher studs 8 and 9. A spring 11 swings the feeler lever 5 clockwise and allows it to assume its initial position. In the turning point 22 below this system, an intermediate lever 12 is provided in a rotatable manner between the stop members 14 and 15. The intermediate lever 12 is provided with an angular strap 16 forming, together with an angular member 17, an opened trap as shown in FIGURE 1. The angular member 17 is provided on a girder 18 swingable through 90°, which is connected to a strip 19 in a point 13 at the intermediate lever 12; a snap spring 20 gives the intermediate lever 12 a corresponding mechanical initial stress.

Figure 2:
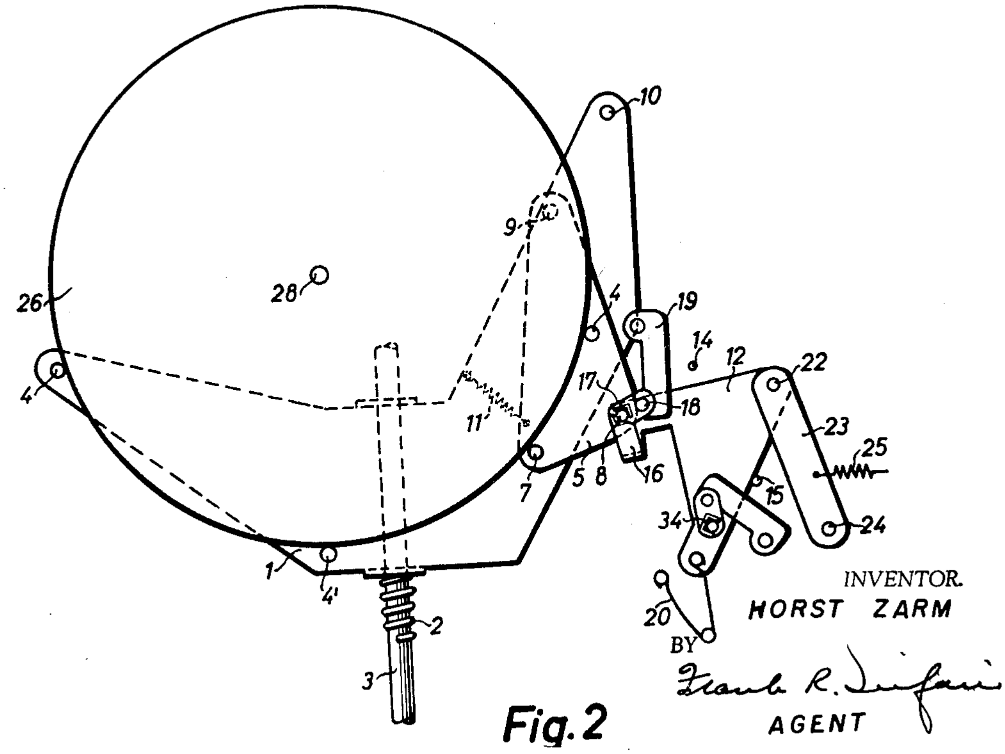
FIGURE 2 shows the device with a record of 17 cm. diameter inserted.

In FIGURE 2 additional details are shown which were not shown in FIGURE 1 for clearness' sake, namely in point 22 a control lever 23 with a catcher stud 24 and a spring 25 is provided. The operation and the object of these parts will be explained hereinafter. In the initial position shown, the central centring stud 4' is near to the edge of the turntable 29 rotatable about a journal pin 28.

Figure 3:
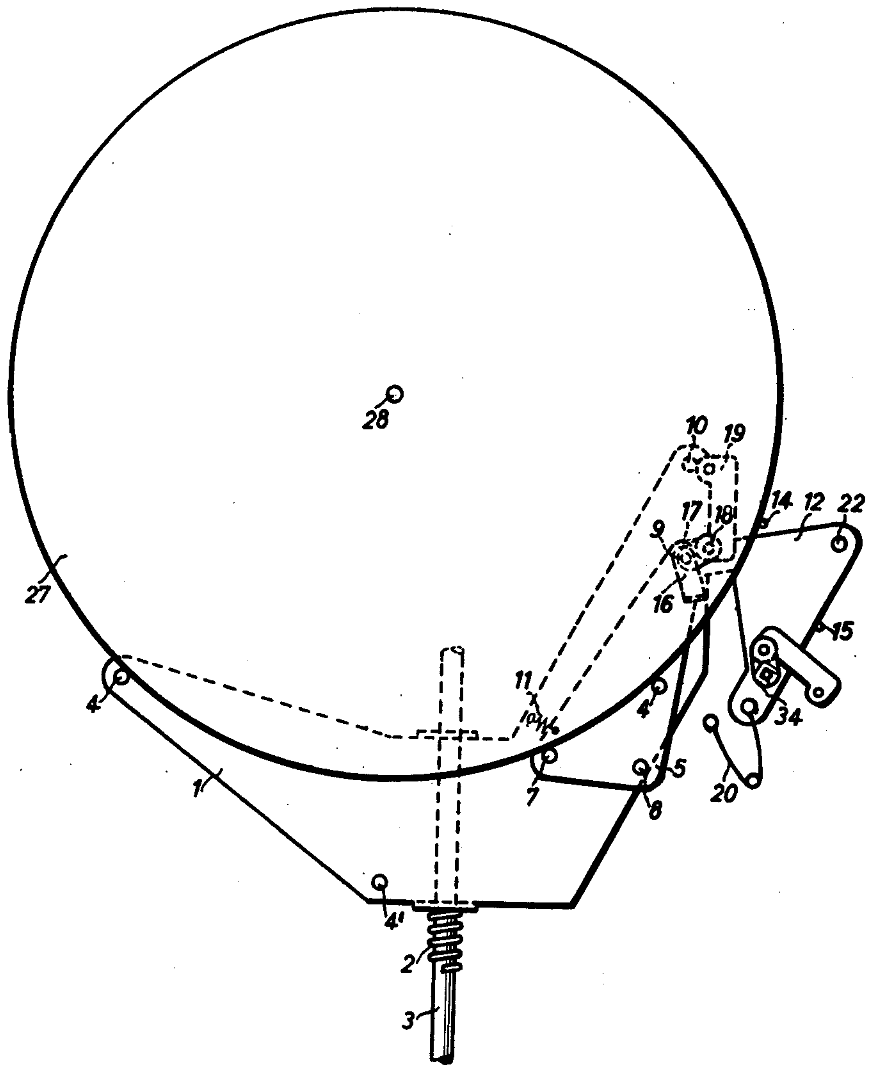
FIGURE 3 shows the device with a record of 25 cm. diameter inserted.
Figures 4, 5:
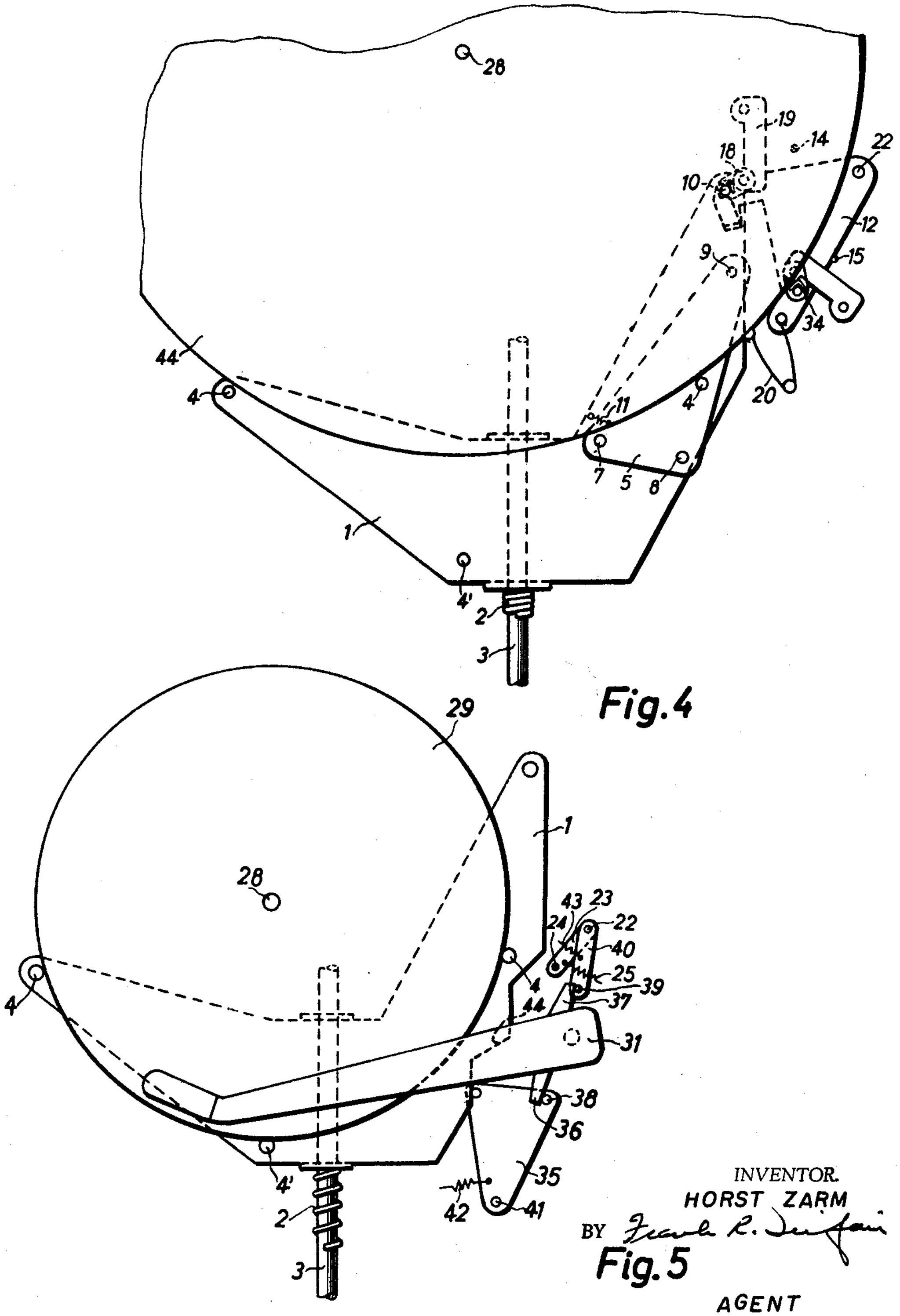
FIGURE 4 shows the device with a record of 30 cm. diameter inserted.
FIGURE 5 shows details of the automatic tone arm control.

If a disc, for example of 17 cm. diameter, see FIG. 2, is pressed with its edge against the feeler studs 4, 4', the feeler stud 7 and with it the feeler lever 5 are swung counter-clockwise in a manner such that the first catcher stud 8 is immediately located opposite to the trap 16, 17. When moving the disc, it shifts the slide 1 ahead of it, the catcher stud 8 presses against the wall 16 of the trap and moves the intermediate lever 12 with attached girder 18 against the action of the spring 20 past its dead centre position into the position shown in FIGURE 2, the trap 16, 17 closing. In the case of records of different diameters, corresponding operations take place. FIGURE 3 shows the trap of a 25 cm. diameter disc and, according to the smaller curve of the edge of the record, the feeler stud 7, when inserting the record, is not moved so far, so that the catcher stud 8 passes the trap on the left-hand side and only the catcher stud 9 falls into it. The slide 1 has covered a correspondingly longer path, for the centre of the disc must naturally lie at the pivot 28 as soon as the disc reaches its position for reproduction. As shown in FIGURE 4, in the case of a 30 cm. record, also the catcher stud 9 passes the trap and the catcher stud 10 provided immediately at the slide 1 falls into it.

As shown in FIGURE 2, the trap 34 opens when the trap 16, 17 closes and releases the catcher stud 24. By means of the spring 25, the lever 23 is brought into the position shown and consequently shifts a curve disc not shown in FIGURE 2 closing in known manner the circuit switch and opening the low-frequency switch, sets up the tone arm on the record, introduces the centring stud into the central hole of the record etc. By using the lever 23 it is achieved that the said operations are performed only when the record is introduced in its position for reproduction.

It is shown in FIGURE 5, that, simultaneously with the movement of shifting the slide 1, the tone arm 31 is swung into the position corresponding to the diameter of the record in question. For this purpose, the inclined side of the slide on the right-hand side, is constructed as a curve 44 in contrast with the other drawings. Naturally, on this side of the slide also a correspondingly shaped strip may be provided. A lever 35 provided on the base plate of the reproduction device engages the curve 44 by means of a pivot or stop member and is for this purpose correspondingly pre-stressed by the spring 42. The tone arm 31 is in addition provided with fixed studs 36, 37 engaging the levers 35, 40 at studs 38, 39. For this purpose, the lever 40 is also prestressed by a spring 43. The turning points of the two levers are designated by 22 and 41 respectively. The forces exerted by the said springs are so strong as to be able for the spring 43 to return the tone arm after the reproduction operation, also causing the tone arm to engage the stud 38 firmly, which position is also assumed invariably by the lever 35 under the action of the curve 44; however, the force of the spring 42 is not exceeded by the spring 43; the spring 25, however, is so powerful that, after insertion of the record and opening the second trap, the lever 40 is moved, in the manner as is the case with a maximum indicator pointer, by the lever 23. The catcher stud 24, for example, engages the edge of the lever 40. In this measure, the tone arm is released for the operation of reproduction.

After reproduction of the record, the lever 12 is returned by the mechanism of the apparatus; the spring 2 operates to eject the record and returns the slide 1 to its initial position shown in FIGURE 1.

Figure 6:
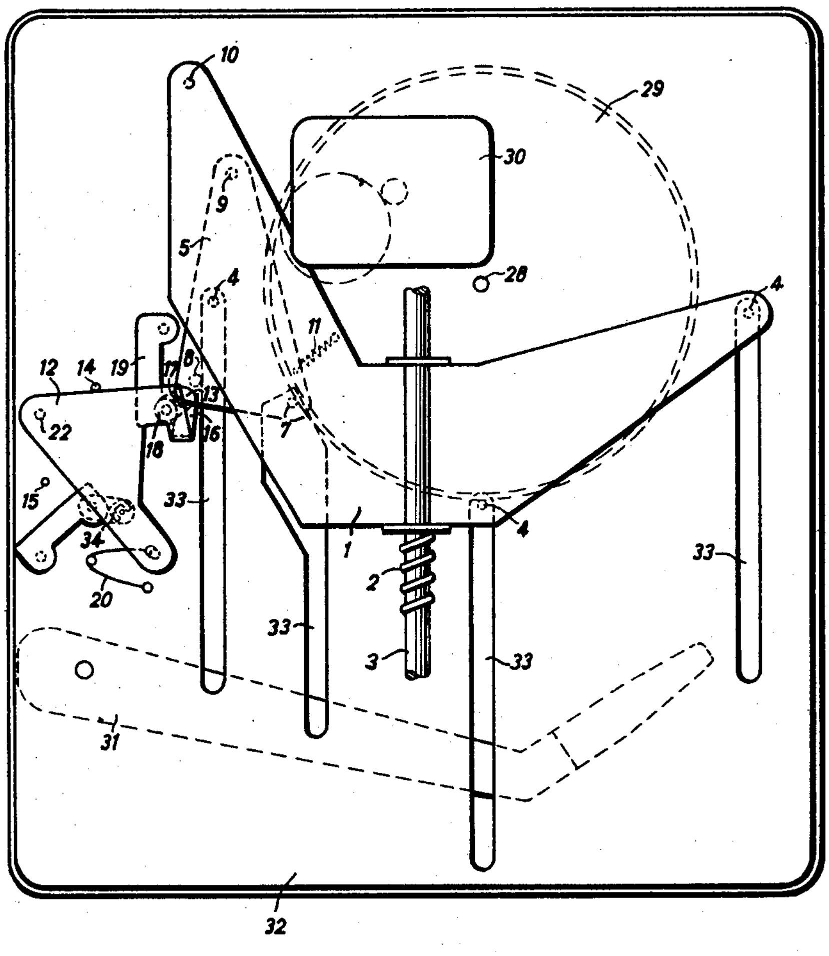
FIGURE 6 shows the parts shown in FIGURE 1 in connection with the base plate of the apparatus viewed from below.

For clearness' sake, the reproduction device is shown once again, this time viewed from below, in FIGURE 6, so as to show the position of the slide, the lever etc. in the mutual arrangement and in their arrangement to the base plate 32 of the reproduction device. The mechanism is shown in its rest position. In addition, FIGURE 6 diagrammatically shows how the turntable 29 is actuated by the motor 30 in known manner via a friction wheel. Since in addition the catcher studs 4, 4' and the feeler stud 7 should extend before the edge of the record, the base plate 32 of the apparatus is provided with corresponding slides 35 serving as penetration apertures for the said studs, and the penetration aperture for the feeler stud 7 is shaped so that the said swinging motion can be performed in addition to a shifting in the direction of the remaining slide 33.

What is claimed is:

1. A semi-automatic, side-insertion phonograph for records of different diameters having a driving motor and comprising a plurality of feelers for scanning the diameter of the record before it reaches the predetermined position for playing, a spring, a shiftable slide movable against said spring in the direction of insertion of said phonograph record, said feelers coacting with said shiftable slide, means operatively connected to said slide whereby the shifting of said slide controls the permitted depth of insertion of said record and the centering of the inserted record and the switching on of said driving motor, said feelers comprising at least one stud engaging the edge of said record, a feeler lever including a plurality of other studs thereon, a trap for selected studs which traps the selected stud corresponding to a certain diameter record momentarily before the record reaches its position for playing, and coupling members connected to said trap whereby when said trap is closed the further course of the switching operation is controlled.

2. A semi-automatic, side-insertion phonograph for phonograph records of different diameters as claimed in claim 1 wherein one of the feeler studs is mounted on said slide and corresponds in location to the playing position of the largest diameter record handled by said phonograph.

3. A semi-automatic, side-insertion phonograph for phonograph records of different diameters having a driving motor and a turntable driven thereby and comprising a plurality of feelers for scanning the diameter of the record before it reaches the predetermined position for playing, a spring, a shiftable slide movable against said spring in the direction of insertion of said phonograph record, said feelers coacting with said shiftable slide, means operatively connected to said slide whereby the shifting of said slide controls the permitted depth of insertion of said record and the centering of the inserted record and the switching on of said driving motor, said feelers comprising at least one stud engaging the edge of said record, a feeler lever including a plurality of other studs thereon, a trap for selected studs which traps the selected stud corresponding to a certain diameter record momentarily before the record reaches its position for playing, and coupling members connected to said trap whereby when said trap is closed the further course of the switching operation is controlled, one of said studs being located between two other studs whereby in the rest position of said slide said one stud is positioned adjacent to said turntable and becomes operative upon the insertion in said phonograph of the smallest diameter record handled by said phonograph.

4. A semi-automatic, side-insertion phonograph for phonograph records of different diameters having a driving motor and comprising a plurality of feelers for scanning the diameter of the record before it reaches the predetermined position for playing, a spring, a shiftable slide movable against said spring in the direction of insertion of said phonograph record, said feelers coacting with said shiftable slide, means operatively connected to said slide whereby the shifting of said slide controls the permitted depth of insertion of said record and the centering of the inserted record and the switching on of said driving motor, said feelers comprising at least one stud engaging the edge of said record, a feeler lever including a plurality of other studs thereon, a trap for selected studs which traps the selected stud corresponding to a certain diameter record momentarily before the record reaches its position for playing, and coupling members connected to said trap whereby when said trap is closed the further course of the switching operation is controlled, said trap further including a strip shiftable in the direction of insertion of the record to be played, a U-shaped receiving member coacting with said strip, an angular member, a pivoting locking bar having said angular member mounted thereon and selected studs insertable in said U-shaped receiving member.

5. A semi-automatic, side-insertion phonograph for phonograph records of different diameters as claimed in claim 4 wherein said strip is further provided with an intermediate lever, a spring, a pair of spaced stop members, said spring urging said lever to a position predetermined by one of said stop members.

6. A semi-automatic, side-insertion phonograph for phonograph records of different diameters having a driving motor and comprising a plurality of feelers for scanning the diameter of the record before it reaches the predetermined position for playing, a spring, a shiftable slide movable against said spring in the direction of insertion of said phonograph record, said feelers coacting with said shiftable slide, means operatively connected to said slide whereby the shifting of said slide controls the permitted depth of insertion of said record and the centering of the inserted record and the switching on of said driving motor, said feelers comprising at least one stud engaging the edge of said record, a feeler lever including a plurality of other studs thereon, a trap for selected studs which traps the selected stud corresponding to a certain diameter record momentarily before the record reaches its position for playing, and coupling members connected to said trap whereby when said trap is closed the further course of the switching operation is controlled, and an intermediate lever including an additional trap which upon certain predetermined movement of said intermediate lever causes said trap to co-act with one of said studs, the release of said stud from said trap causing various operations of said phonograph to be performed.

7. A semi-automatic, side-insertion phonograph for phonograph records of different diameters as claimed in claim 6 further comprising a control lever wherein said one of said studs is provided thereon, a spring prestressing said control lever, said control lever when operating serves to control the operations for playing records.

8. A semi-automatic, side-insertion phonograph for phonograph records of different diameters having a driving motor and comprising a plurality of feelers for scanning the diameter of the record before it reaches the predetermined position for playing, a spring, a shiftable slide movable against said spring in the direction of insertion of said phonograph record, said feelers coacting with said shiftable slide, means operatively connected to said slide whereby the shifting of said slide controls the permitted depth of insertion of said record and the centering of the inserted record and the switching on of said driving motor, said feelers comprising at least one stud engaging the edge of said record, a feeler lever including a plurality of other studs thereon, a trap for selected studs which traps the selected stud corresponding to a certain diameter record momentarily before the record reaches its position for playing, coupling members connected to said trap whereby when said trap is closed the further course of the switching operation is controlled, a tone arm, and an adjusting device for said tone arm coupled to said shiftable slide, said adjusting device when inserting a record to be played in said phonograph swings said tone arm into a position corresponding to the initial groove of said record whereby when said tone arm is lowered, the selected scanning feeler is set up for the particular record to be played.

9. A semi-automatic, side-insertion phonograph for records of different diameters as claimed in claim 8 wherein a part of the side edge adjacent to said tone arm is constructed as a control curve and further comprising an intermediate member adapted to slide along said curve and swing said tone arm only outwards.

10. A semi-automatic, side-insertion phonograph for records of different diameters as claimed in claim 9 wherein said intermediate member is a lever provided with a stop member, further comprising a spring biasing said lever against said control curve, a stud on said tone arm being engaged by said stop member, a pair of control levers and associated structure co-acting to exert a torque on said tone arm to cause the latter to follow the shape of the control curve.

11. A semi-automatic, side-insertion phonograph for phonograph records of different diameters having a driving motor and comprising a plurality of feelers for scanning the diameter of the record before it reaches the predetermined position for playing, a spring, a shiftable slide movable against said spring in the direction of insertion of said phonograph record, said feelers co-acting with said shiftable slide, means operatively connected to said slide whereby the shifting of said slide controls the permitted depth of insertion of said record and the centering of the inserted record and the switching on of said driving motor, said feelers comprising at least one stud engaging the edge of said record, a feeler lever including a plurality of other studs thereon, a trap for selected studs which traps the selected stud corresponding to a certain diameter record momentarily before the record reaches its position for playing, coupling members connected to said trap whereby when said trap is closed the further course of the switching operation is controlled, and a support for said shiftable slide of such dimensions as to effect a self-retardation when inserting a record into the phonograph at an angle to the normal direction of insertion.

References Cited in the file of this patent

UNITED STATES PATENTS

| | | |
|---|---|---|
| 2,100,686 | Collaro | Nov. 30, 1937 |
| 2,485,575 | Deaver | Oct. 25, 1949 |
| 2,670,210 | Thompson | Feb. 23, 1954 |